United States Patent
Yamada et al.

(10) Patent No.: US 7,135,835 B2
(45) Date of Patent: Nov. 14, 2006

(54) CONVERTER APPARATUS, INVERTER APPARATUS, AND DC LINK VOLTAGE CONTROL METHOD

(75) Inventors: Yuuichi Yamada, Yamanashi (JP); Shigeki Hanyu, Yamanashi (JP); Tomokazu Yoshida, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/200,201

(22) Filed: Aug. 10, 2005

(65) Prior Publication Data

US 2006/0033466 A1     Feb. 16, 2006

(30) Foreign Application Priority Data

Aug. 10, 2004 (JP) ............................. 2004-233385

(51) Int. Cl.
*H02P 27/04*     (2006.01)
(52) U.S. Cl. .................. 318/800; 320/137; 320/138; 320/166; 363/34; 363/37; 363/116
(58) Field of Classification Search ............... 318/801, 318/800; 320/137, 138, 166; 324/239; 363/34, 363/37, 116; 702/193; 93/907
See application file for complete search history.

(56) References Cited

U.S. PATENT DOCUMENTS

| | | | | |
|---|---|---|---|---|
| 5,814,954 A | * | 9/1998 | Suzuki et al. | ............... 318/376 |
| 6,118,678 A | * | 9/2000 | Limpaecher et al. | ........... 363/60 |
| 6,801,019 B1 | * | 10/2004 | Haydock et al. | ............... 322/17 |
| 6,804,126 B1 | * | 10/2004 | Lucas | ....................... 363/21.01 |
| 7,042,178 B1 | * | 5/2006 | Yamada et al. | .............. 318/376 |
| 2002/0053490 A1 | * | 5/2002 | Banno et al. | ................ 187/290 |
| 2003/0089557 A1 | * | 5/2003 | Eilinger | ...................... 187/296 |
| 2003/0107349 A1 | * | 6/2003 | Haydock et al. | .............. 322/28 |
| 2004/0217728 A1 | * | 11/2004 | Kawaji et al. | .............. 318/801 |
| 2005/0099829 A1 | * | 5/2005 | Wei et al. | ...................... 363/34 |

FOREIGN PATENT DOCUMENTS

JP     3107831     9/2000

* cited by examiner

*Primary Examiner*—Rita Leykin
(74) *Attorney, Agent, or Firm*—Staas & Halsey LLP

(57) ABSTRACT

The invention is directed to the provision of a converter apparatus, an inverter apparatus, and a DC link voltage control method, wherein the upper limit value of the DC link voltage that rises due to regenerative energy occurring from a motor is set high, thereby increasing the regenerative energy to be stored in a DC link. The converter apparatus (10) comprises: a voltage detection part (11) for monitoring the DC link voltage occurring across the DC link (30); and a charge stopping part (12) for stopping charging a power storage part (C) when the detected value of the DC link voltage exceeds a predetermined upper limit voltage as the motor (3) is decelerated.

11 Claims, 5 Drawing Sheets

CONVERTER APPARATUS, INVERTER APPARATUS, AND DC LINK VOLTAGE CONTROL METHOD

BACKGROUND OF THE INVENTION

1. Field of the Invention

The present invention relates to a converter apparatus that converts AC power supplied from a power source into DC power and supplies the DC power to an inverter to drive a motor, and an inverter apparatus that drives a motor by being supplied with power from such a converter apparatus. More particularly, the invention relates to a method for controlling the DC link voltage appearing across a DC link connected between such a converter apparatus and inverter apparatus, and a converter apparatus and inverter apparatus that can control such a DC link voltage.

2. Description of the Related Art

FIG. 1 is a diagram showing the configuration of a prior art inverter apparatus for controlling the speed of a motor. The inverter apparatus 1 comprises: a converter apparatus 10 for converting AC power supplied from a three-phase commercial power source 2 into DC power; an inverter circuit 20 for converting the DC power into variable-voltage variable-frequency AC power for supply to a motor 3; and a DC link 30 connected between the converter apparatus 10 and the inverter circuit 20 for transmitting the DC power, converted by the converter apparatus 10, to the inverter circuit 20.

The prior art converter apparatus 10 includes a three-phase diode bridge circuit comprising diodes $D_{11}$ to $D_{16}$, and converts the AC power supplied from the three-phase AC power source 2 into the DC power by performing full-wave rectification using the bridge circuit.

On the other hand, the inverter circuit 20 comprises a bridge circuit formed by transistors $T_{21}$ to $T_{26}$ and diodes $D_{21}$ to $D_{26}$ connected in parallel with the respective transistors. Then, an AC voltage signal having a desired voltage and frequency is generated by controlling the ON/OFF operations of the respective transistors $T_{21}$ to $T_{26}$ by an inverter control part 21 which is, for example, a transistor PWM control circuit, and the speed of the motor 3 is controlled by supplying the AC voltage signal to the motor 3.

A capacitor C is connected to the DC link 30, and the capacitor C functions to smooth the output of the converter apparatus 10 and to store the regenerative power occurring due to the induced electromotive force produced in the motor 3 when the motor 3 is decelerated or caused to stop. The regenerative power stored in the capacitor C is reused to drive the motor, thus enabling the reuse of regenerative energy (deceleration energy).

The voltage (DC link voltage) applied to the capacitor C changes when the motor is accelerating, running at constant speed, and decelerating. For example, during acceleration, the voltage drops because power is supplied to the motor from the power supply unit; conversely, during deceleration, the voltage rises because energy is fed from the motor back into the power supply unit.

An electrolytic capacitor, for example, is used as the capacitor C. Generally, such a capacitor C has a rated device breakdown voltage, and if a voltage greater than the rated device breakdown voltage is applied to the capacitor, breakdown of the capacitor may occur.

Therefore, in the prior art inverter apparatus 1, a regenerative resistor R is connected in parallel to the capacitor C, as shown in FIG. 1. Then, when the DC link voltage occurring across the DC link 30 exceeds the set voltage, a transistor $T_3$ is turned on, causing the current to flow through the regenerative resistor R and thus reducing the voltage applied to the capacitor C.

SUMMARY OF THE INVENTION

To increase the reusable regenerative energy by increasing the amount of charge stored in the capacitor C, the induced electromotive force of the motor must be set so that the DC link voltage after deceleration of the motor 3 becomes higher than the DC link voltage before the deceleration. However, the above configuration in which the capacitor C is protected by using the regenerative resistor R has had the problem that, because of the need to prevent thermal breakdown of the regenerative resistor R due to excessive current flow, the DC link voltage cannot be increased by a large amount.

The method of protecting the capacitor C by the regenerative resistor R has had the further problem that the reuse efficiency of the regenerative energy is not good because excessive power is simply dissipated as heat.

Further, as the variation of the DC link voltage during deceleration of the motor 3 can affect the controllability of the motor 3, it is desired to suppress a variation in the DC link voltage. However, when the regenerative resistor R is used to suppress a variation in the DC link voltage, there arises the problem that the reuse efficiency is not good because the regenerative energy from the motor 3 is dissipated as heat.

Accordingly, it is an object of the present invention to provide a converter apparatus, an inverter apparatus, and a DC link voltage control method wherein provisions are made to enhance the reuse efficiency of the regenerative energy.

To achieve the above object, the converter apparatus according to the present invention includes a charge stopping part which monitors the DC link voltage occurring across the DC link, and which stops charging a power storage part in the DC link when the DC link voltage rises and exceeds a predetermined upper limit voltage as the motor is decelerated.

More specifically, according to a first aspect of the present invention, there is provided a converter apparatus which is connected via a DC link to an inverter circuit for driving a motor, the DC link having a power storage part capable of storing regenerative power from the motor, and which converts AC power supplied from a power source into DC power and supplies the DC power to the inverter circuit through the DC link, the converter apparatus comprising: a voltage detection part for detecting the DC link voltage appearing across the DC link; and a charge stopping part for stopping the charging the power storage part when the detected DC link voltage exceeds a predetermined upper limit voltage.

The upper limit voltage may be determined based on the breakdown voltage of any one of component devices in the converter apparatus, the DC link, and the inverter circuit or on the breakdown voltage of the power storage part; alternatively, with reference to the DC link voltage detected when the power storage part begins to store the regenerative power from the motor, the upper limit value may be determined by adding a predetermined potential difference to the value of the DC link voltage. For this purpose, the converter apparatus may include a voltage value storing part for storing the value of the DC link voltage detected by the voltage detection part when the power storage part begins to store the regenerative power.

The charge stopping by the charging stopping part may be accomplished by causing the converter apparatus to feed the power stored in the power storage part back into the power source when the detected DC link voltage exceeds the upper limit voltage. Here, provisions may be made so that when the detected DC link voltage exceeds the upper limit voltage, the charge stopping part causes the converter apparatus to start feeding the power stored in the power storage part back into the power source and, when the DC link voltage detected thereafter is lower than the upper limit voltage by a predetermined level, the charge stopping part causes the converter apparatus to stop feeding back the power.

According to a second aspect of the present invention, there is provided an inverter apparatus wherein the DC power supplied through the DC link after conversion by the converter apparatus according to the first aspect of the present invention is converted by the inverter circuit into AC power to drive the motor.

According to a third aspect of the present invention, there is provided a method for controlling the DC link voltage appearing across a DC link connected between an inverter for driving a motor and a converter for converting AC power supplied from a power source into DC power and for supplying the DC power to the inverter, the DC link having a power storage part capable of storing regenerative power from the motor, wherein the control method comprises: detecting the DC link voltage; and stopping charging the power storage part with the regenerative power when the detected DC link voltage exceeds a predetermined upper limit voltage due to the regenerative power occurring from the motor.

Here, as in the converter apparatus according to the first aspect, the upper limit voltage may be set to a prescribed voltage value, or alternatively, with reference to the DC link voltage detected when the power storage part begins to store the regenerative power from the motor, the upper limit value may be determined by adding a predetermined potential difference to the value of the DC link voltage. For this purpose, the method may store the value of the DC link voltage detected when the power storage part begins to store the regenerative power.

BRIEF DESCRIPTION OF THE DRAWINGS

These and other objects and features of the present invention will become more fully apparent from the description of the preferred embodiments as set forth below with reference to the accompanying drawings.

DETAILED DESCRIPTION

Figure 1:
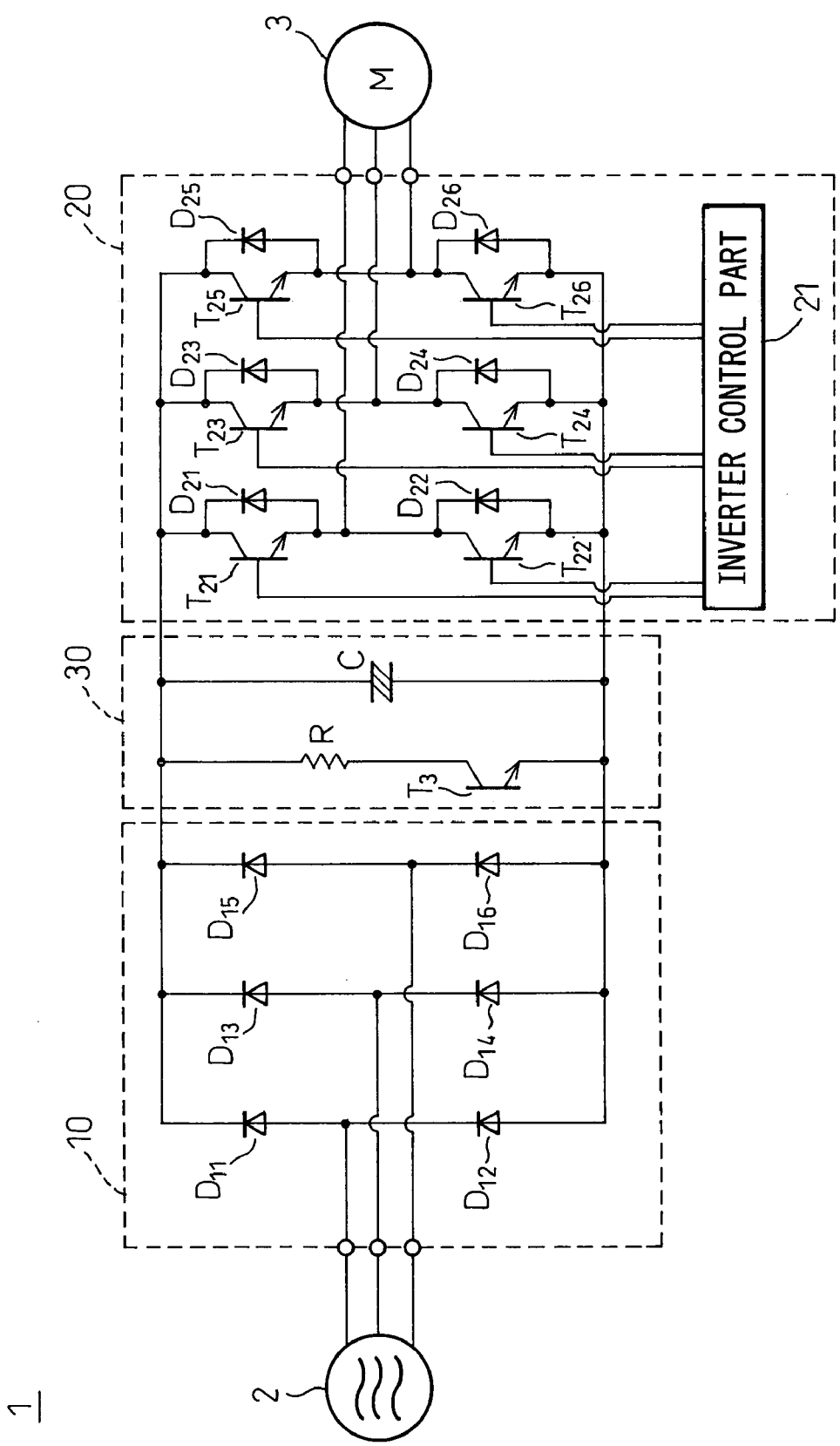
FIG. 1 is a diagram showing the configuration of a prior art inverter apparatus.
Figure 2:
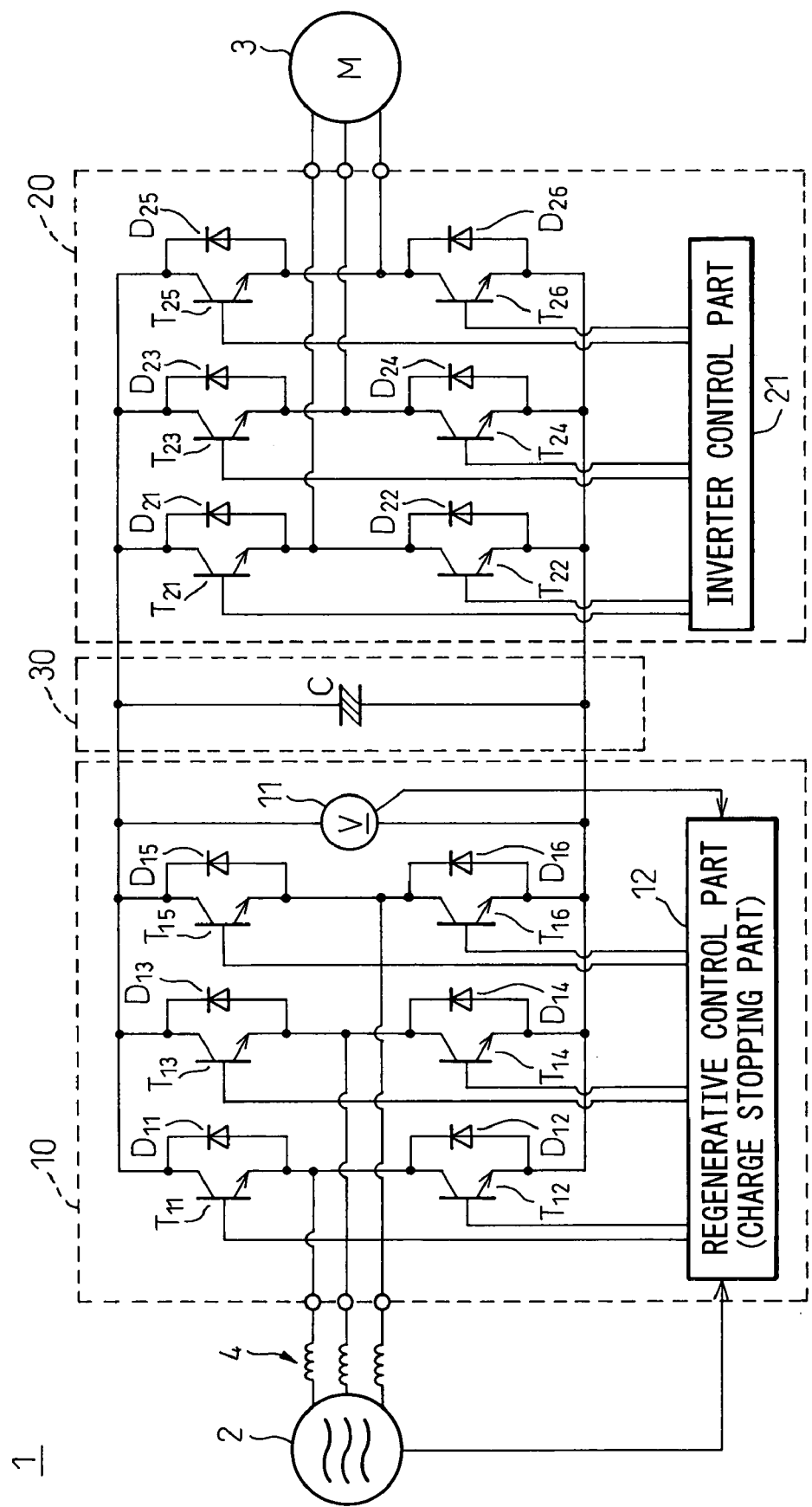
FIG. 2 is a diagram schematically showing the configuration of a converter apparatus according to a first embodiment of the present invention and an inverter apparatus comprising the same.

Preferred embodiments of the present invention will be described in detail below with reference to the accompanying drawings. FIG. 2 is a diagram schematically showing the configuration of a converter apparatus according to a first embodiment of the present invention and an inverter apparatus according to the embodiment of the present invention that comprises the converter apparatus.

As shown, the inverter apparatus 1 comprises: the converter apparatus 10, connected to a three-phase commercial power source 2 via reactance 4, for converting the supplied power into DC power; an inverter circuit 20 for converting the DC power into variable-voltage variable-frequency AC power for supply to a motor 3; and a DC link 30 connected between the converter apparatus 10 and the inverter circuit 20 for transmitting the DC power, converted by the converter apparatus 10, to the inverter circuit 20.

The converter apparatus 10 comprises: a bridge circuit constructed from power devices (for example, transistors) $T_{11}$ to $T_{16}$ and diodes $D_{11}$ to $D_{16}$ connected in reverse and parallel with the respective power devices; and a voltage detection part 11 for detecting an output voltage of the converter apparatus 10 which is equal to the DC voltage appearing across the DC link connected at the subsequent stage.

The converter apparatus 10 further comprises a regenerative control part 12, constituting a charge stopping part of the present invention which, when the DC link voltage exceeds its upper limit voltage due to the regenerative power (regenerative energy or deceleration energy) occurring during deceleration of the motor 3, feeds the regenerative power back into the power source 2 thereby reducing the DC link voltage and stopping the regenerative power from being stored in a power storage part C (to be described later) connected to the DC link 30.

With the above configuration, during normal power operation, the converter apparatus 10 converts the AC power supplied from the three-phase AC power source 2 into DC power by performing full-wave rectification using the diodes $D_{11}$ to $D_{16}$. On the other hand, during regeneration, the converter apparatus 10 feeds the regenerative power back into the power source 2 by driving the power devices $T_{11}$ to $T_{16}$ synchronously with the phases of the three-phase AC power source 2.

On the other hand, the inverter circuit 20 comprises a bridge circuit formed by power devices $T_{21}$ to $T_{26}$ and diodes $D_{21}$ to $D_{26}$ connected in reverse and parallel with the respective power devices. Then, an AC voltage signal having a desired voltage and frequency is generated by controlling the ON/OFF operations of the power devices $T_{21}$ to $T_{26}$ by an inverter control part 21 which is, for example, a transistor PWM control circuit, and the speed of the motor 3 is controlled by supplying the AC voltage signal to the motor 3.

The power storage part C, which is implemented using, for example, a capacitor, is connected to the DC link 30. The power storage part C functions to smooth the output of the converter apparatus 10 and to store the regenerative power occurring due to the induced electromotive force produced in the motor 3 when the motor 3 is decelerated or caused to stop, thus enabling the reuse of regenerative energy.

Figure 3:
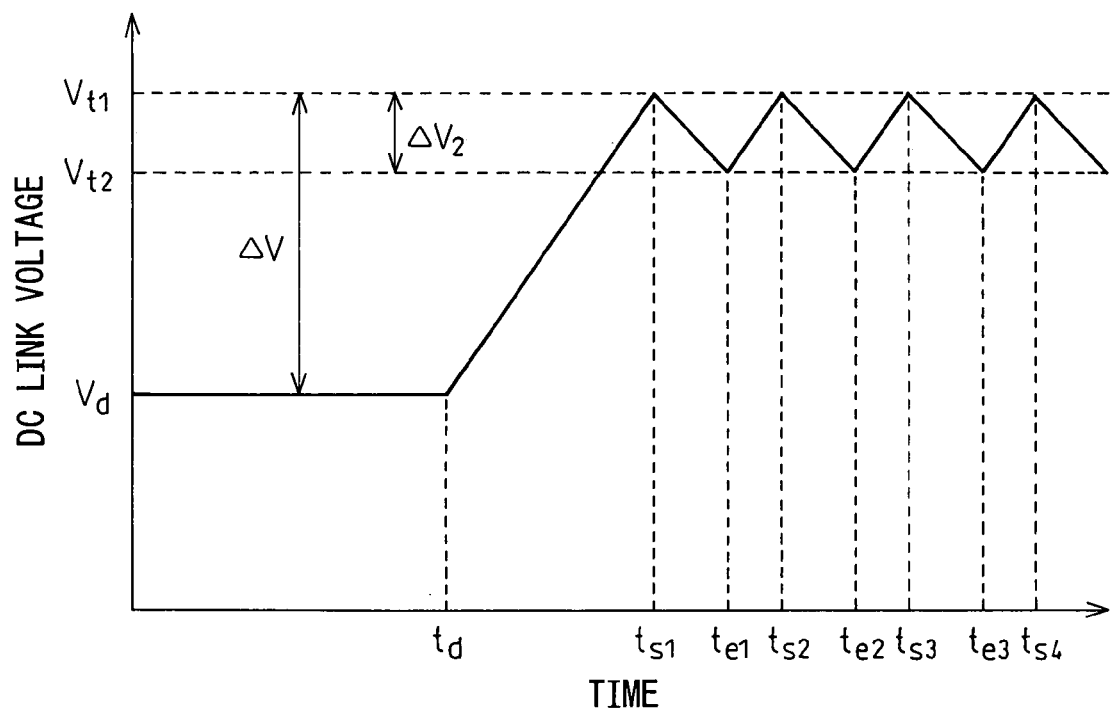
FIG. 3 is a graph for explaining how the DC link voltage is controlled by the converter apparatus of FIG. 2 during regeneration.

FIG. 3 is a graph for explaining how the DC link voltage is controlled by the converter apparatus of FIG. 2 during regeneration.

The situation where the motor 3 running under normal power operating condition or at constant speed begins to decelerate at time $t_d$ is shown in FIG. 3. The DC link voltage staying substantially constant at a voltage value $V_d$ up to that time begins to increase at time $t_d$ as the regenerative power occurs due to the induced electromotive force of the motor 3. Thereafter, the DC link voltage continues to rise until it reaches a predetermined upper limit voltage $V_{t1}$ at time $t_{s1}$.

In the meantime, the voltage detection part 11 detects the DC link voltage, and the regenerative control part 12 constantly monitors the value detected by the voltage detection part 11. When the DC link voltage exceeds the upper limit voltage $V_{t1}$, the regenerative control part 12 drives the power devices $T_{11}$ to $T_{16}$ synchronously with the phases of the power source 2, thus causing the regenerative current to be fed back into the power source 2 and thereby reducing the DC link voltage.

The upper limit voltage is preset as a DC link allowable voltage based on the device breakdown voltage of the power storage part C or on the device breakdown voltage of the power devices $T_{11}$ to $T_{26}$, the diodes $D_{11}$ to $D_{26}$, etc. forming the converter apparatus 10, the DC link 30, and the inverter circuit 20, and is determined so as to prevent these devices from breaking down due to an excessive rise of the DC link voltage during the regenerative operation of the motor 3.

Then, the DC link voltage decreases as the regenerative power is fed back into the power source and, when the DC link voltage decreases at time $t_{e1}$ to a voltage $V_{t2}$ which is lower than the upper limit voltage $V_{t1}$ by a predetermined level $\Delta V_2$, the feeding back of the regenerative power to the power source 2 is stopped, whereupon the DC link voltage begins to increase.

Thereafter, the same operation as described above is repeated; that is, each time the DC link voltage increases up to the predetermined upper limit voltage $V_{t1}$ at time $t_{s2}$, $t_{s3}$, and $t_{s4}$, respectively, during which the motor 3 is decelerating, the feeding back of the regenerative power to the power source 2 is resumed, and each time the DC link voltage decreases to the voltage $V_{t2}$ lower than the upper limit voltage $V_{t1}$ by the predetermined level $\Delta V_2$ at time $t_{e2}$ and $t_{e3}$, respectively, the feeding back of the regenerative power to the power source 2 is stopped.

With the above method that prevents an excessive voltage application and excessive charging of the power storage part C by feeding the regenerative power back into the power source and thereby reducing the DC link voltage, the difference $\Delta V$ between the DC link voltages before and after the regenerative energy charging can be set larger than with the earlier described prior art method.

The difference $\Delta V$ between the DC link voltages before and after the regenerative energy charging is determined by the maximum potential difference between the upper limit voltage $V_{t1}$ and the DC link voltage $V_d$ before the regenerative energy charging (or before deceleration of the motor) (the upper limit voltage $V_{t1}$–the DC link voltage $V_d$ before the regenerative energy charging), and this difference determines the amount of regenerative energy to be stored in the power storage part C. Accordingly, when the DC link voltage difference $\Delta V$ is set larger, the amount of regenerative energy to be stored in the power storage part C can be increased.

Further, as the excessive regenerative energy is fed back into the power source 2, the regenerative energy can be effectively utilized compared with the prior art regenerative energy handling method that dissipates the energy as heat through a resistive element.

Figure 4:
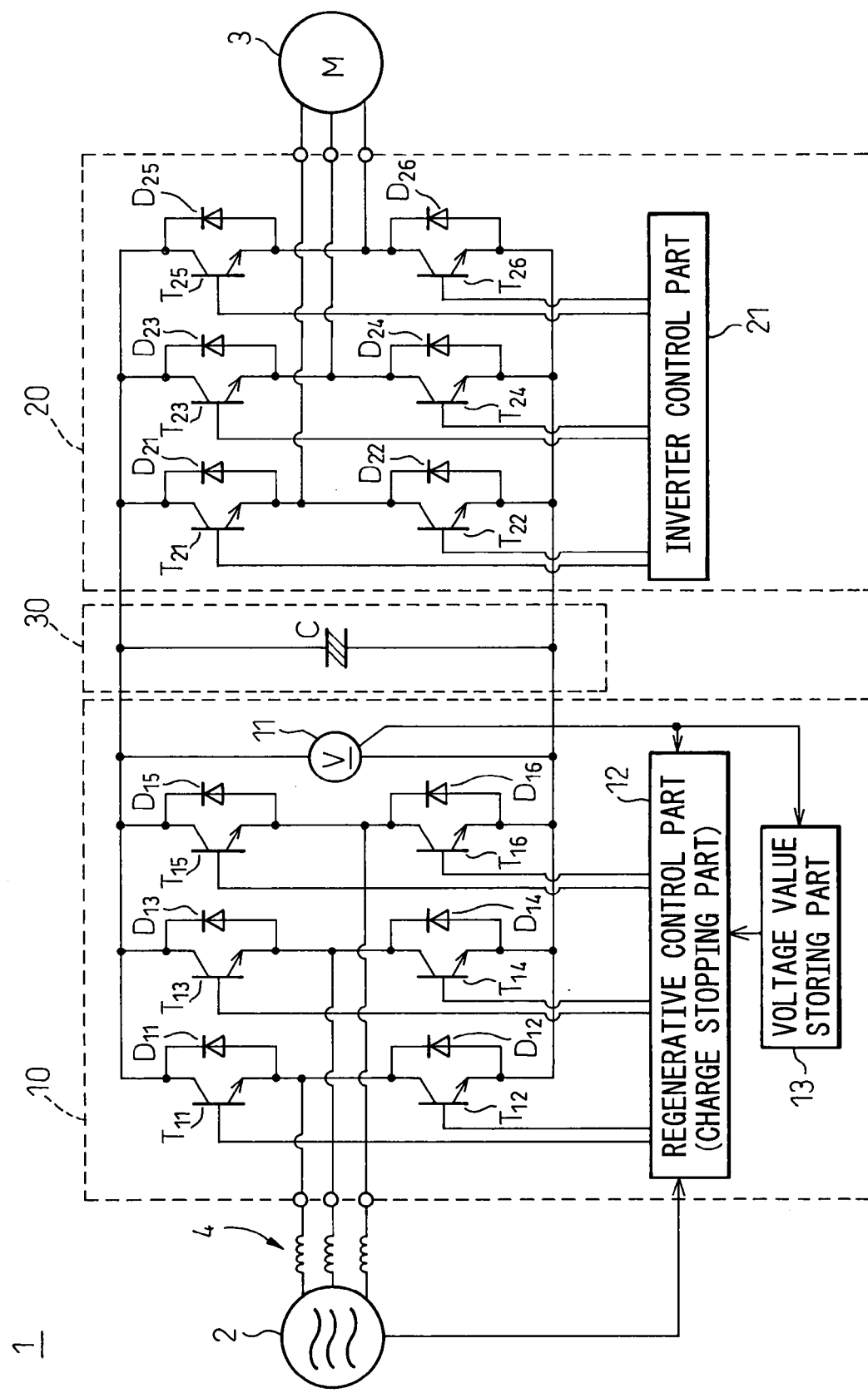
FIG. 4 is a diagram schematically showing the configuration of a converter apparatus according to a second embodiment of the present invention and an inverter apparatus comprising the same.

FIG. 4 is a diagram schematically showing the configuration of a converter apparatus according to a second embodiment of the present invention and an inverter apparatus according to the embodiment of the present invention that comprises the converter apparatus.

In the present embodiment, the DC link voltage $V_d$ appearing when the power storage part C begins to store the regenerative power from the motor 3 (that is, when the motor 3 begins to decelerate) is detected and the detected voltage value is stored; then, with reference to the thus detected voltage, the upper limit voltage of the DC link voltage is determined by adding a predetermined potential difference $\Delta V_1$ to the stored value of DC link voltage $V_d$ and, when this upper limit voltage is exceeded, the regenerative control part 12 begins to feed the regenerative power back into the power source.

For this purpose, the inverter apparatus 10 includes a voltage value storing part 13 for storing the value of the DC link voltage $V_d$ detected by the voltage detection part 11 when the power storage part C began to store the regenerative power from the motor 3.

The regenerative control part 12 monitors the voltage detected by the voltage detection part 11, and determines whether the amount of increase of the detected voltage is within the predetermined allowable range within which the voltage is expected to change when the motor 3 is controlled at constant speed; when the amount of increase of the detected voltage exceeds the predetermined allowable range, then it is determined that the motor 3 has begun to decelerate, that is, the power storage part C has begun to store the regenerative power from the motor, and the value of the DC link voltage $V_d$ detected at this time is stored in the voltage value storing part 13.

Alternatively, the regenerative control part 12 detects the deceleration of the motor 3 by receiving a speed signal from a speed signal generator (not shown) such as a tachometer generator or an encoder attached to the motor 3 and, when it is detected from this speed signal that the power storage part C has begun to store the regenerative power from the motor, the value of the DC link voltage $V_d$ detected at this time is stored in the voltage value storing part 13.

Here, the regenerative control part 12 may perform control so that when it is determined that the regenerative power has begun to be stored or that the motor 3 has begun to decelerate, the value of the DC link voltage detected and temporarily stored at the immediately preceding moment is stored in the voltage value storing part 13. That is, the DC link voltage $V_d$ appearing just before the power storage part C begins to store the regenerative power from the motor 3, or just before the motor 3 begins to decelerate, may be detected, and the voltage value obtained by adding the predetermined potential difference $\Delta V_1$ to this link voltage $V_d$ may be used as the upper limit voltage value.

Figure 5:
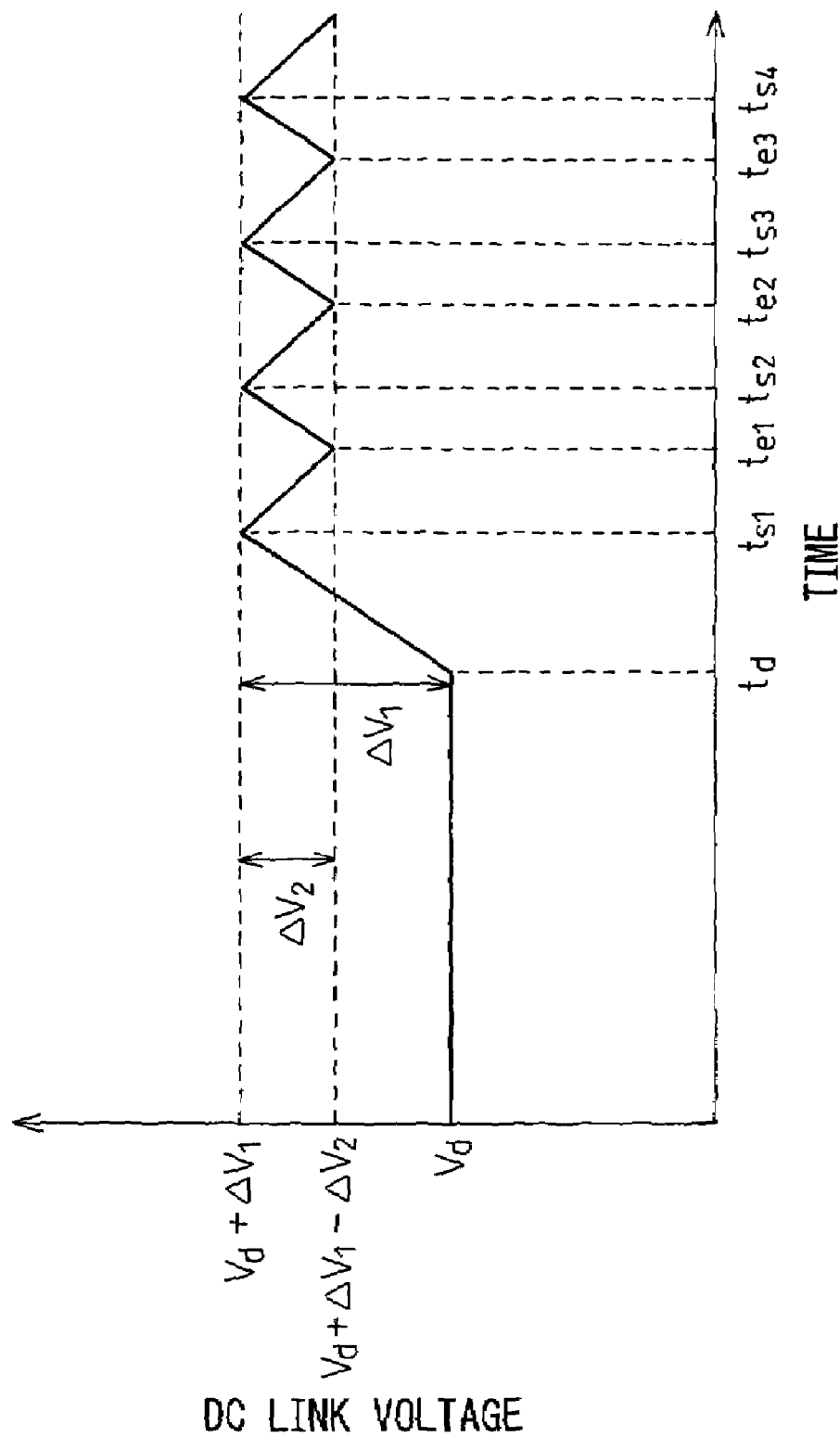
FIG. 5 is a graph for explaining how the DC link voltage is controlled by the converter apparatus of FIG. 4 during regeneration.

FIG. 5 is a graph for explaining how the DC link voltage is controlled by the converter apparatus of FIG. 4 during regeneration. One example of the DC link voltage control will be described with reference to FIG. 5.

The situation where the motor 3 running under normal power operating condition or at constant speed begins to decelerate at time $t_d$ is shown in FIG. 5. Then, the DC link voltage staying substantially constant at a voltage value $V_d$ up to that time begins to increase at time $t_d$ as the regenerative power occurs due to the induced electromotive force of the motor 3, and the DC link voltage soon exceeds the predetermined allowable range within which the voltage is expected to change when the motor 3 is controlled to a constant speed. Thereupon, the regenerative control part 12 detects by the above-described method that the motor 3 has begun to decelerate and the power storage part C has begun to store the regenerative power. Then, the regenerative control part 12 stores the value of the DC link voltage $V_d$ detected at this time in the voltage value storing part 13.

The DC link voltage continues to increase until it reaches the upper limit voltage $V_d+\Delta V_1$ at time $t_{s1}$, where $V_d$ is the DC link voltage value stored in the voltage value storing part 13 and $\Delta V_1$ is the predetermined potential difference. Here, the regenerative control part 12 drives the power devices $T_{11}$ to $T_{16}$ synchronously with the phases of the power source 2, thus causing the regenerative current to be fed back into the power source 2 and thereby reducing the DC link voltage.

Then, the DC link voltage decreases as the regenerative power is fed back into the power source and, when the DC link voltage decreases at time $t_{e1}$ to a voltage $V_d+\Delta V_1-\Delta V_2$ which is lower than the upper limit voltage $V_d+\Delta V_1$ by a predetermined level $\Delta V_2$, the feeding back of the regenerative power to the power source 2 is stopped, whereupon the DC link voltage begins to increase.

Thereafter, the same operation as described above is repeated; that is, each time the DC link voltage exceeds the upper limit voltage $V_d+\Delta V_1$ during deceleration of the motor 3 at time $t_{s2}$, $t_{s3}$, and $t_{s4}$, respectively, the converter apparatus 10 resumes the feeding back of the regenerative power to the power source 2, and each time the DC link voltage decreases to the voltage $V_d+\Delta V_1-\Delta V_2$ at time $t_{e2}$ and $t_{e3}$, respectively, the converter apparatus 10 stops the feeding back of the regenerative power to the power source 2.

In this way, the converter apparatus 10 controls the variation of the DC link voltage during deceleration of the motor 3 to within the range between the voltage $V_d+\Delta V_1-\Delta V_2$ and the voltage $V_d+\Delta V_1$. This prevents the variation of the DC link voltage from adversely affecting the controllability of the motor 3. As, at this time, the regenerative energy is fed back into the power source 2, the converter apparatus 10 of the present embodiment can make effective use of the regenerative energy when performing control to hold the DC link voltage variation within the predetermined range.

According to the present invention, because of the provision of the charge stopping part which constantly monitors whether the DC link voltage exceeds the predetermined upper limit voltage during deceleration of the motor and which stops charging the power storage part when the upper limited voltage is exceeded, the upper limit voltage value of the DC link voltage during regeneration can be set larger than in the prior art method that uses a resistive element to handle the regenerative energy. In particular, as the charge stopping operation of the charge stopping part is accomplished by causing the converter apparatus to feed the regenerative energy back into the power source, not only can the upper limit voltage value of the DC link voltage be set larger than in the prior art method that uses a resistive element to handle the regenerative energy, but the reuse efficiency of the regenerative energy of the motor 3 can be enhanced.

Furthermore, by setting the upper limit voltage based on the device breakdown voltage of the various component devices or of the power storage part, breakdown of these devices can be reliably prevented.

Further, when the upper limit voltage is set equal to the voltage value determined by adding a predetermined potential difference to the DC link voltage detected when the power storage part begins to store the regenerative power from the motor, it becomes possible to efficiently control the variation of the DC link voltage occurring due to the regenerative energy from the motor.

The present invention is applicable to a converter apparatus that converts AC power supplied from a power source into DC power and supplies the DC power to an inverter to drive a motor, and an inverter apparatus that drives a motor by being supplied with power from such a converter apparatus.

While the present invention has been described with reference to the preferred embodiments selected only for illustrative purposes, it will be apparent to those skilled in the art that various modifications, omissions, and departures can be made to these embodiments without departing from the spirit and scope of the present invention. Further, it is to be understood that the terms used in the appended claims are not limited to the specific meanings used in the embodiments described in this specification.

What is claimed is:

1. A converter apparatus which is connected via a DC link to an inverter circuit for driving a motor, said DC link having a power storage part capable of storing regenerative power from said motor, and which converts AC power supplied from a power source into DC power and supplies said DC power to said inverter circuit through said DC link, said converter apparatus comprising:
   a voltage detection part detecting a DC link voltage appearing across said DC link; and
   a charge stopping part stopping charging said power storage part when the DC link voltage detected by the voltage detection part exceeds a predetermined upper limit voltage.

2. A converter apparatus as claimed in claim 1, wherein said predetermined upper limit voltage is determined based on the breakdown voltage of any one of component devices in said converter apparatus, said DC link, and said inverter circuit or on the breakdown voltage of said power storage part.

3. A converter apparatus as claimed in claim 1, further comprising a voltage value storing part for storing the value of the DC link voltage detected when said power storage part begins to store said regenerative power, wherein
   said charge stopping part stops charging said power storage part when the DC link voltage currently detected by said voltage detection part exceeds the upper limit voltage whose value is set by adding a predetermined potential difference to the value of the DC link voltage stored in said voltage value storing part.

4. A converter apparatus as claimed in claims 1, wherein when said detected DC link voltage exceeds said upper limit voltage, said charge stopping part causes said converter apparatus to feed the power stored in said power storage part back into said power source.

5. A converter apparatus as claimed in claims 1, wherein when said detected DC link voltage exceeds said upper limit voltage, said charge stopping part causes said converter apparatus to start feeding the power stored in said power storage part back into said power source and, when the DC link voltage detected after starting feeding the power back into said power source is lower than said upper limit voltage by a predetermined level, said charge stopping part causes said converter apparatus to stop feeding back said power.

6. An inverter apparatus wherein said DC power supplied through said DC link after conversion by a converter apparatus as claimed in 1 is converted by said inverter circuit into AC power to drive said motor.

7. A method for controlling a DC link voltage appearing across a DC link connected between an inverter for driving a motor and a converter for converting AC power supplied from a power source into DC power and for supplying said DC power to said inverter, said DC link having a power storage part capable of storing regenerative power from said motor, wherein said control method comprises:

detecting said DC link voltage; and stopping charging said power storage part with said regenerative power when the DC link voltage detected by a voltage detection part exceeds a predetermined upper limit voltage due to the regenerative power occurring from said motor.

8. A control method as claimed in claim 7, further comprising:

storing the value of the DC link voltage detected when said power storage part begins to store said regenerative power; and stopping charging said power storage part when the DC link voltage currently detected exceeds the upper limit voltage whose value is set by adding a predetermined potential difference to said stored value of said DC link voltage.

9. A control method as claimed in claim 7, wherein when said detected DC link voltage exceeds said upper limit voltage, said converter is caused to feed the power stored in said power storage part back into said power source.

10. A converter apparatus connected via a DC link to an inverter circuit and connected to a power source, comprising:

a power storage part storing regenerative power from a motor; and a charge stopping part causing regenerative current to be fed back into the power source and thereby reducing DC link voltage across the DC link to stop storing the regenerative power when the DC link voltage exceeds an upper limit voltage.

11. A method of controlling a DC link voltage across a DC link connecting an inverter circuit and a converter apparatus, comprising:

storing regenerative power from a motor; and causing regenerative current to be fed back into a power source connected to the converter apparatus and thereby reducing the DC link voltage across the DC link to stop storing the regenerative power when the DC link voltage exceeds an upper limit voltage.

* * * * *